(12) United States Patent
Kim et al.

(10) Patent No.: US 9,032,315 B2
(45) Date of Patent: May 12, 2015

(54) PORTABLE TERMINAL REFLECTING USER'S ENVIRONMENT AND METHOD FOR OPERATING THE SAME

(75) Inventors: Hyang Ah Kim, Seongnam-si (KR); Tae Won Um, Seoul (KR); Dong Jun Shin, Seoul (KR); Kyoung Taek Kim, Seongnam-si (KR); Kyung Hwa Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 91 days.

(21) Appl. No.: 12/851,587

(22) Filed: Aug. 6, 2010

(65) Prior Publication Data

US 2011/0035675 A1  Feb. 10, 2011

(30) Foreign Application Priority Data

Aug. 7, 2009  (KR) .................. 10-2009-0072650

(51) Int. Cl.
G06F 3/048 (2013.01)
G06Q 50/32 (2012.01)
G06Q 10/10 (2012.01)

(52) U.S. Cl.
CPC ............. *G06Q 50/32* (2013.01); *G06Q 10/10* (2013.01)

(58) Field of Classification Search
CPC ... G06F 3/0481; G06F 3/0482; G06F 9/4443; H04M 1/72583; H04N 5/44543
USPC .................. 715/764, 765, 810, 811, 825, 864
See application file for complete search history.

(56) References Cited

U.S. PATENT DOCUMENTS

| | | | |
|---|---|---|---|
| 5,414,809 A | 5/1995 | Hogan et al. | |
| 5,465,358 A | 11/1995 | Blades et al. | |
| 5,724,985 A | 3/1998 | Snell et al. | |
| 6,567,104 B1 | 5/2003 | Andrew et al. | |
| 6,661,438 B1 * | 12/2003 | Shiraishi et al. | 715/835 |
| 6,874,127 B2 * | 3/2005 | Newell et al. | 715/744 |
| 6,912,386 B1 | 6/2005 | Himberg et al. | |

(Continued)

FOREIGN PATENT DOCUMENTS

| | | |
|---|---|---|
| CN | 101098530 A | 1/2008 |
| CN | 101420487 A | 4/2009 |

(Continued)

OTHER PUBLICATIONS

Hightower, et al.; "Location Sensing Techniques", Aug. 8, 2001; University of Washington, Computer Science and Engineering; Seattle, Washington.

(Continued)

*Primary Examiner* — Rashawn Tillery
(74) *Attorney, Agent, or Firm* — Cha & Reiter, LLC

(57) ABSTRACT

A portable terminal reflecting a user's environment and a method for operating the same are disclosed. The method includes: generating usage pattern information that contains pattern environment information of the portable terminal and function information corresponding to the pattern environment information; collecting current environment information of the portable terminal; searching for pattern environment information that is substantially identical to the collected current environment information; extracting function information corresponding to the searched pattern environment information; and configuring a graphic user interface (GUI) based on the extracted function information.

15 Claims, 7 Drawing Sheets

(56) References Cited

U.S. PATENT DOCUMENTS

| | | | |
|---|---|---|---|
| 7,185,290 B2* | 2/2007 | Cadiz et al. | 715/838 |
| 7,725,832 B2* | 5/2010 | Cadiz et al. | 715/736 |
| 8,005,729 B1* | 8/2011 | Ulm et al. | 705/30 |
| 8,026,805 B1* | 9/2011 | Rowe | 340/539.1 |
| 8,135,777 B2 | 3/2012 | Colligan et al. | |
| 2002/0133545 A1 | 9/2002 | Fano et al. | |
| 2002/0160817 A1* | 10/2002 | Salmimaa et al. | 455/566 |
| 2003/0020816 A1 | 1/2003 | Hunter et al. | |
| 2003/0046401 A1* | 3/2003 | Abbott et al. | 709/228 |
| 2004/0204063 A1 | 10/2004 | Van Erlach | |
| 2005/0044508 A1 | 2/2005 | Stockton | |
| 2005/0054381 A1 | 3/2005 | Lee et al. | |
| 2005/0204310 A1* | 9/2005 | De Zwart et al. | 715/821 |
| 2006/0048064 A1* | 3/2006 | Vronay | 715/764 |
| 2006/0094447 A1 | 5/2006 | Zellner | |
| 2006/0107219 A1* | 5/2006 | Ahya et al. | 715/745 |
| 2006/0156209 A1 | 7/2006 | Matsuura et al. | |
| 2007/0022380 A1 | 1/2007 | Swartz et al. | |
| 2007/0061735 A1* | 3/2007 | Hoffberg et al. | 715/744 |
| 2007/0298843 A1 | 12/2007 | Kwon | |
| 2008/0036591 A1 | 2/2008 | Ray | |
| 2008/0155476 A1 | 6/2008 | Forbes et al. | |
| 2008/0162037 A1 | 7/2008 | Hasan Mahmoud | |
| 2008/0182591 A1* | 7/2008 | Krikorian | 455/456.3 |
| 2008/0318616 A1 | 12/2008 | Chipalkatti et al. | |
| 2009/0049389 A1 | 2/2009 | Kuzmanovic | |
| 2009/0083663 A1* | 3/2009 | Kim | 715/811 |
| 2009/0280817 A1* | 11/2009 | Chavez et al. | 455/445 |
| 2010/0031198 A1* | 2/2010 | Zimmerman et al. | 715/853 |
| 2010/0041422 A1 | 2/2010 | Wormald et al. | |
| 2010/0083169 A1* | 4/2010 | Athsani et al. | 715/810 |
| 2010/0188279 A1 | 7/2010 | Shamilian et al. | |
| 2010/0235203 A1* | 9/2010 | Baskin et al. | 705/7 |
| 2010/0285786 A1 | 11/2010 | Yamada et al. | |
| 2010/0323750 A1 | 12/2010 | Tomita | |
| 2011/0035675 A1 | 2/2011 | Kim et al. | |

FOREIGN PATENT DOCUMENTS

| | | |
|---|---|---|
| EP | 1 631 050 A1 | 3/2006 |
| JP | 2009-033256 A | 2/2009 |
| KR | 10-2006-0019320 | 3/2006 |
| KR | 10-2006-0057411 | 5/2006 |
| KR | 10-2007-0013442 | 1/2007 |
| KR | 10-2007-0014596 A | 2/2007 |
| KR | 10-0905622 | 6/2009 |
| WO | 01/50151 A1 | 7/2001 |
| WO | 02/089342 A1 | 11/2002 |
| WO | 2004-077291 A1 | 9/2004 |
| WO | 2008/096596 A1 | 8/2008 |
| WO | 2009/063441 A2 | 5/2009 |

OTHER PUBLICATIONS

Kim, Hyang Ah, et al.; Patent Application Publication No. US 2009/0156124 A1; Publication Date: Jun. 18, 2009; "Portable Communication Device Having Matching Function and Portable . . . ;".

* cited by examiner

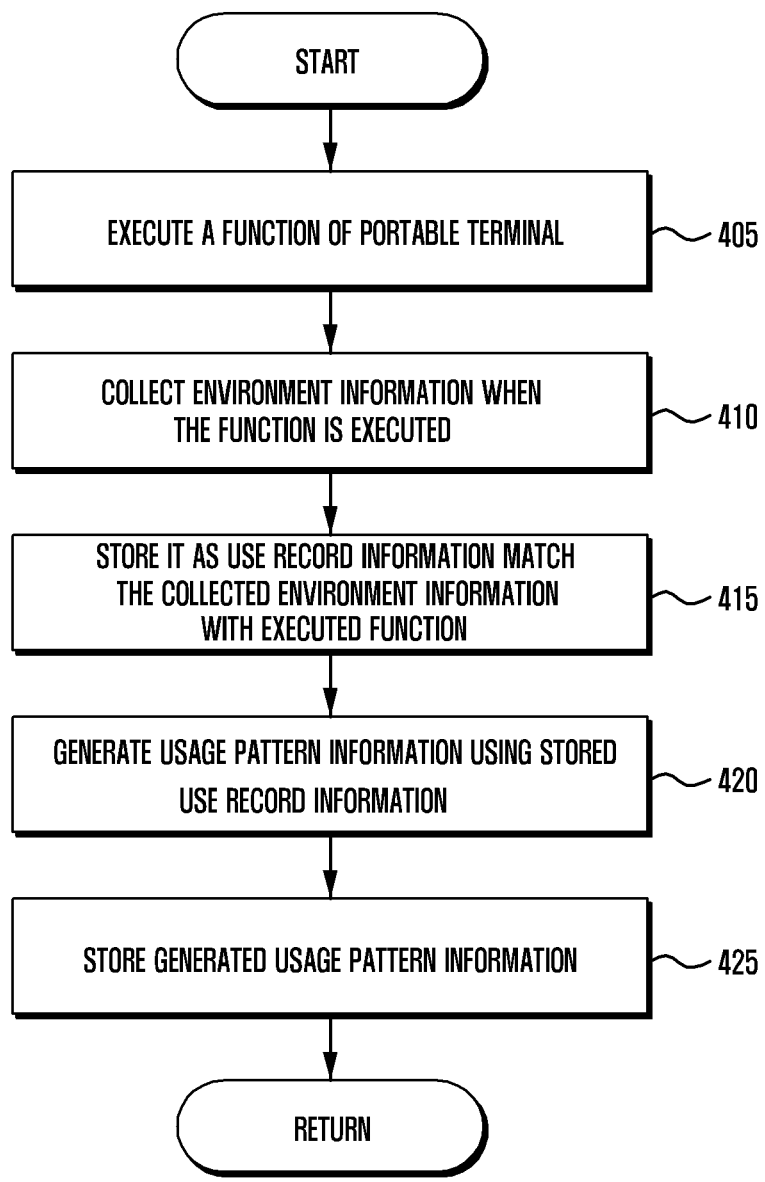

FIG. 5

| FUNCTION INFO | TIME INFO | LOCATION INFO |
|---|---|---|
| CALL [MIN-SU KIM] | 13:21, 7.11, 2009 | A APT. SEOCHO-DONG SEOCHO-GU SEOUL |
| MUSIC PLAYBACK [FIRE] | 13:35, 7.11, 2009 | A APT. SEOCHO-DONG SEOCHO-GU SEOUL |
| CALL [CHEOL-SU KIM] | 14:35, 7.11, 2009 | 679 YEOKSAM-DONG GANGNAM-GU SEOUL |
| CALL [MIN-SU KIM] | 13:25, 7.12, 2009 | A APT. SEOCHO-DONG SEOCHO-GU SEOUL |
| MUSIC PLAYBACK [FIRE] | 13:40, 7.12, 2009 | A APT. SEOCHO-DONG SEOCHO-GU SEOUL |
| MUSIC PLAYBACK [LOVE] | 14:31, 7.12, 2009 | 679 YEOKSAM-DONG GANGNAM-GU SEOUL |
| CALL [MIN-SU KIM] | 13:31, 7.13, 2009 | A APT. SEOCHO-DONG SEOCHO-GU SEOUL |
| MUSIC PLAYBACK [LOVE] | 13:37, 7.13, 2009 | A APT. SEOCHO-DONG SEOCHO-GU SEOUL |
| CALCULATOR | 13:37, 7.13, 2009 | A APT. SEOCHO-DONG SEOCHO-GU SEOUL |
| CALL [CHEOL-SU KIM] | 14:30, 7.13, 2009 | A APT. SEOCHO-DONG SEOCHO-GU SEOUL |
| MUSIC PLAYBACK [FIRE] | 13:41, 7.14, 2009 | A APT. SEOCHO-DONG SEOCHO-GU SEOUL |
| MUSIC PLAYBACK [LOVE] | 14:30, 7.14, 2009 | 679 YEOKSAM-DONG GANGNAM-GU SEOUL |
| CALL [CHEOL-SU KIM] | 14:40, 7.14, 2009 | 679 YEOKSAM-DONG GANGNAM-GU SEOUL |
| MUSIC PLAYBACK [LOVE] | 14:32, 7.15, 2009 | 679 YEOKSAM-DONG GANGNAM-GU SEOUL |
| ⋮ | ⋮ | ⋮ |

FIG. 6

| PATTERN TIME INFO | PATTERN LOCATION INFO | FUNCTION INFO |
|---|---|---|
| 13:00 ~ 14:00 | A APT. SEOCHO-DONG SEOCHO-GU SEOUL | COMMUNICATION [MIN-SU KIM], MUSIC PLAYBACK [FIRE] |
| 13:00 ~ 14:00 | 679 YEOKSAM-DONG GANGNAM-GU SEOUL | MUSIC PLAYBACK [LOVE] |
| | ⋮ | |

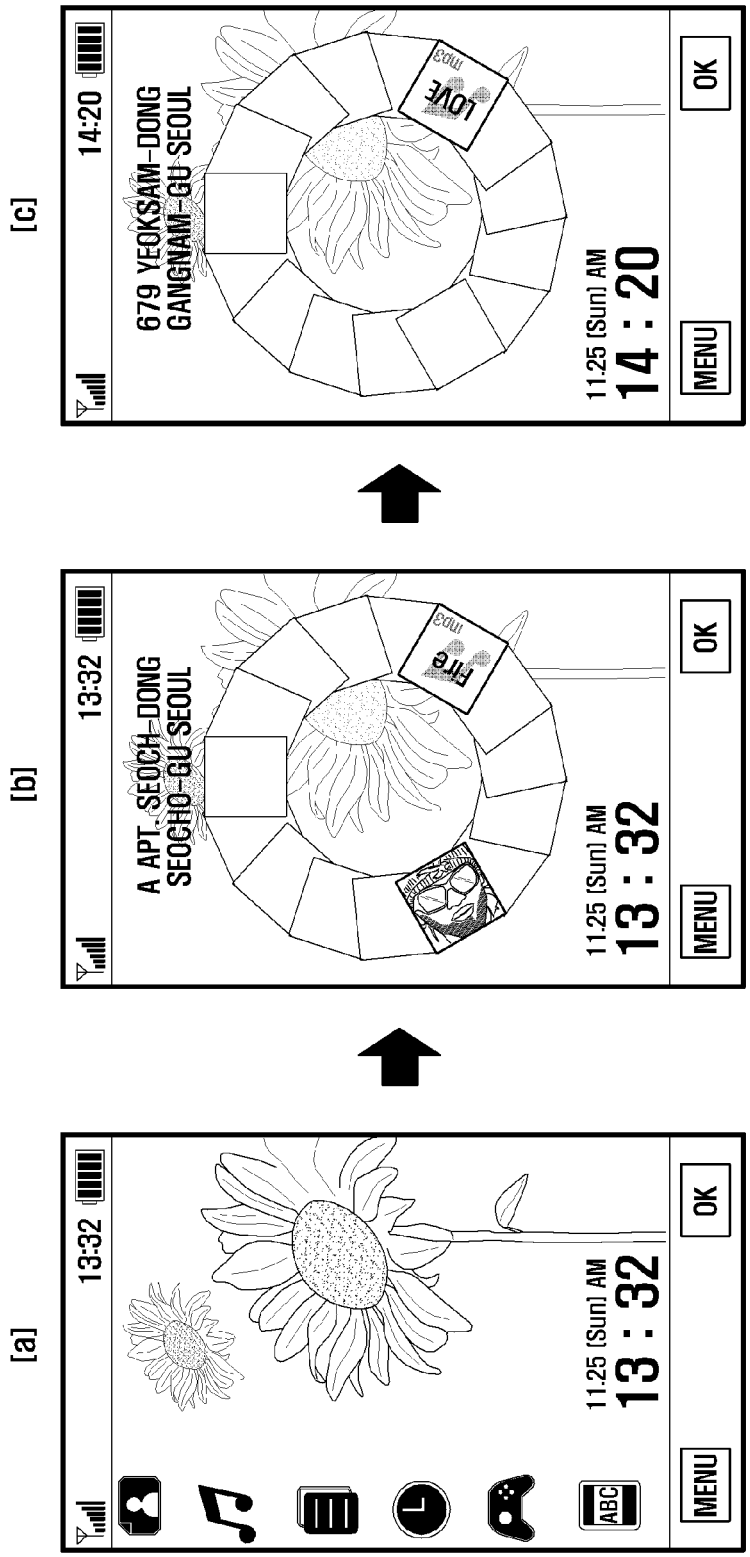

US 9,032,315 B2

PORTABLE TERMINAL REFLECTING USER'S ENVIRONMENT AND METHOD FOR OPERATING THE SAME

CLAIM OF PRIORITY

This application claims priority to and the benefit of the earlier filing date of that patent application entitled "Portable Terminal Reflecting User's Environment and Method For Operating The Same", filed in the Korean Patent Office on Aug. 7, 2009 and afforded serial number 10-2009-0072650, the contents of which are incorporated by reference herein.

BACKGROUND OF THE INVENTION

1. Field of the Invention

The present invention relates to portable communication systems, and more particularly, to a terminal that provides a user interface (UI) appropriate for the user's current environment.

2. Description of the Related Art

Portable communication terminals have been widely used as they can be easily carried and their convenience. Portable terminal can provide a variety of services in addition to their ability to provide vocal communications. For example, portable terminals may provide a data transfer service, as well as a voice call service, so the terminal may serve as a multimedia communication device.

Although portable terminals provide a variety of functions and services, the portable terminal users tend to repeatedly use one or more of the same functions in a certain environment. For example, the user may use the same function at a same known time or at a same known location. As an example, when a worker is going from their house to a workplace, they may listen to music using a portable terminal; and when they arrive at the workplace, they may make a call to their partner using the portable terminal. In addition, after leaving the workplace, the user may watch a movie or a television show via the portable terminal. If a user interface (UI) for performing corresponding functions considering the user's environment is provided to the user, the user can more easily use the portable terminal.

However, conventional portable terminals do not employ technology that analyzes an environment where a user repeatedly uses a particular function, i.e., a user's usage pattern, and applies knowledge of the usage pattern to the portable terminal.

SUMMARY OF THE INVENTION

The present invention has been made in view of the above problems, and provides a method for providing a user interface (UI) appropriate for a user's environment in accordance with the user's usage pattern when the user uses the portable terminal.

The present invention further provides a portable terminal adapted to the method for providing a UI that is appropriate for a user's environment.

In accordance with an exemplary embodiment of the present invention, the present invention provides a method for providing a user interface reflecting user's environment in a portable terminal, including: generating usage pattern information that contains pattern environment information of the portable terminal and function information corresponding to the pattern environment information; collecting current environment information of the portable terminal; searching for pattern environment information that is classified as belonging to the same environment as the collected current environment information; extracting function information set in response to the searched pattern environment information; and configuring a graphic user interface (GUI) based on the extracted function information.

In accordance with another exemplary embodiment of the present invention, the present invention provides a portable terminal reflecting a user's environment, including: an environment information collecting module for collecting environment information of the portable terminal; a storage unit for storing the environment information collected by the environment information collecting module, and usage pattern information that is comprised of pattern environment information and function information; and a controller. The controller collects current environment information of the portable terminal by controlling the environment information collecting module. The controller also searches for pattern environment information that is classified as belonging to the same environment as the collected current environment information from the storage unit. The controller extracts function information set in response to the searched pattern environment information from the storage unit, and configures a graphic user interface (GUI) based on the extracted function information.

In accordance with another aspect of the invention, a portable device comprises an input device, a display device; and a controller comprising: a processor in communication with a memory, the memory including code, which when accessed by the processor causes the processor to: collect current environment information of the portable terminal; search for pattern environment information that is classified as belonging to the same environment as the collected current environment information; extract function information corresponding to the searched pattern environment information; and configure a graphic user interface (GUI) based on the extracted function information, wherein the pattern information contains pattern environment information of the portable terminal and function information corresponding to the pattern environment information.

BRIEF DESCRIPTION OF THE DRAWINGS

The features and advantages of the present invention will become more apparent from the following detailed description in conjunction with the accompanying drawings, in which:

FIG. 4 is a flow chart that describes, the step of generating usage pattern information in the method shown in FIG. 3;

FIG. 5 is a view illustrating an example of use record information stored in a use record information DB 162, according to an embodiment of the present invention;

FIG. 6 is a view illustrating an example of usage pattern information stored in a use pattern information DB 164, according to an embodiment of the present invention;

FIG. 8 show screens displayed when modes are switched, according to an embodiment of the present invention.

DETAILED DESCRIPTION OF THE INVENTION

Exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Figure 1:
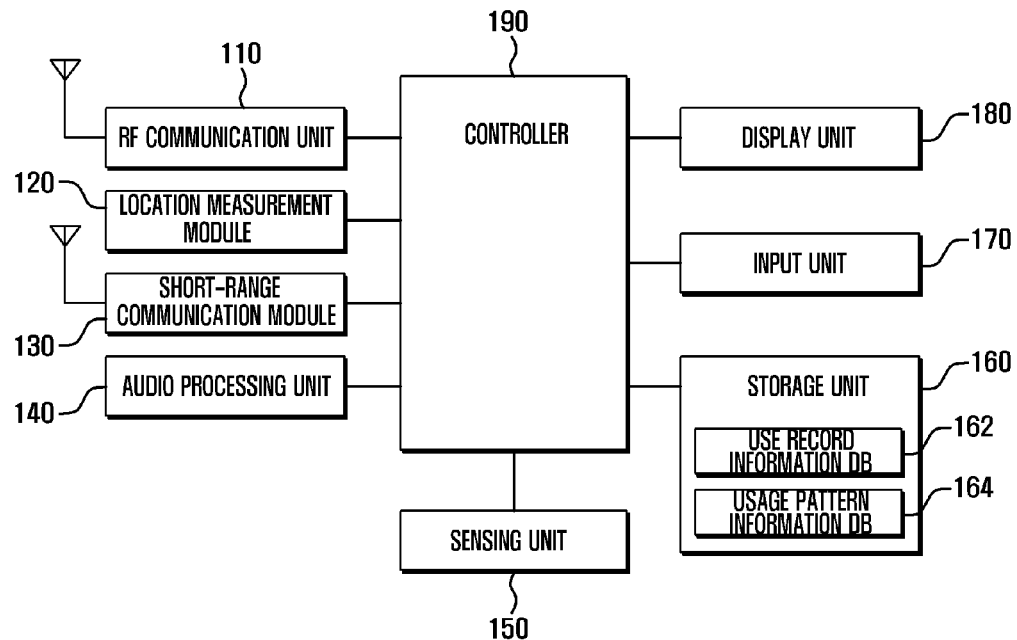
FIG. 1 is a schematic block diagram illustrating a portable terminal reflecting a user's environment, according to an embodiment of the present invention.

FIG. 1 is a schematic block diagram illustrating a portable terminal reflecting user's environment, according to an embodiment of the present invention.

Referring to FIG. 1, an RF communication unit 110 transmits or receives data via RF communication with other portable terminals. The RF communication unit 110 includes an RF transmitter for up-converting the frequency of signals to-be transmitted and amplifying the to-be-transmitted signals and an RF receiver for low-noise amplifying received RF signals and down-converting the frequency of the received RF signals. The RF communication unit 110 receives data via an RF channel and outputs it to a controller 190. The RF communication unit 110 also transmits data, output from the controller 190, to external systems (not shown), via an RF channel. In an embodiment of the present invention, the RF communication unit 110 receives signals from at least three base stations (not shown) and outputs them to the controller 190. The controller 190 can measure a location of the portable terminal using the difference in time (time difference of arrival) among signals transmitted from at least three base stations.

A location measurement module 120 serves to measure a location of the portable terminal. In an embodiment of the present invention, the location measurement module 120 is implemented with a global positioning system (GPS) module. It should be understood that the present invention is not limited to the embodiment. That is, the location measurement module 120 can be implemented with other types of devices that can measure a location of the portable terminal.

A short-range communication module 130 refers to a device that can allow portable terminals to perform data communication with each other within a certain range of radius. The short-range communication module 130 may be a Bluetooth communication module, an Infrared communication module, a Zigbee communication module, etc. The short-range communication module 130 receives information regarding surrounding portable terminals or systems and outputs it to the controller 190. In an embodiment of the present invention, the information regarding surrounding portable terminals or systems is a piece of information contained in 'environment information' and, thus, serves as data to be collected into the 'environment information.'

The audio processing unit 140 may be configured to include a Codec (coder & decoder) (not shown). The Codec includes a data codec for processing packet data, etc. and an audio codec for processing audio signals, such as a voice signal. The audio processing unit 140 converts a digital audio signal into an analog audio signal to play it back through a speaker SPK (not shown), using the audio codec. The audio processing unit 140 also converts an analog audio signal, received by a microphone MIC, into a digital audio signal, using the audio codec. In an embodiment of the present invention, the audio processing unit 140 collects audio signals in the surrounding environment via the microphone MIC and outputs them to the controller 190. The audio signals, acquired by the microphone MIC (not shown), can serve as data for collecting 'location information' regarding the portable terminal.

A sensing unit 150 collects information regarding the surrounding environment. The sensing unit 150 is different than the RF communication unit 110, the location measurement module 120, the short-range communication module 130, and the audio processing unit 140 previously described. The sensing unit 150 may be configured to include an image sensor, an acceleration sensor, a proximity sensor, an illumination sensor, a temperature sensor, a humidity sensor, a tilt sensor, a gyro sensor, a pressure sensor, etc. The image sensor is implemented with a camera module that can capture an image of the surrounding environment and output it to the controller 190. The information regarding the captured image may serve as data to measure location information regarding the portable terminal. For example, if the portable terminal is located in an indoor space and its camera module captures the ceiling of the space, the captured ceiling image may be considered data in order to determine the location of the portable terminal.

The RF communication unit 110, the location measurement module 120, the short-range communication module 130, the audio processing unit 140 and the sensing unit 150 form an environment collecting module for collecting environment information regarding the portable terminal.

A storage unit 160 stores programs that control the operation of the portable terminal, and data generated when the programs are executed. The storage unit 160 is comprised of a program storage area (not shown) and a data storage area (not shown). The storage unit 160 includes a volatile storing medium or a nonvolatile storing medium and a combination thereof. The volatile storing medium includes semiconductor memory, such as RAM, DRAM, SRAM, etc. The nonvolatile storing medium includes a hard disk or semiconductor memory such as PROM or FLASH. In an embodiment of the present invention, the storage unit 160 stores information regarding graphic objects representing respective functions of the portable terminal. An example of the graphic object is a function execution icon. The storage unit 160 includes a use record information DB 162 and a usage pattern information DB 164. The use record information DB 162 stores environment information when a function is executed, matching with information regarding an executed function. The environment information includes time information, location information regarding the portable terminal, and information regarding devices located around the portable terminal. The environment information may further include any information if it can serve to determine the environment. The usage pattern information DB 164 stores usage pattern information generated by the controller 190. The usage pattern information DB 164 stores pattern environment information that matches with function information.

An input unit 170 generates key signals for controlling the operations of the portable terminal and outputs them to the controller 190. The input unit 170 can be implemented with various types of keypads including numerical keys, alphabetical keys, and directional keys, for example a 3×4 keypad, a QWERTY keypad, a touch pad, etc. The input unit 170 generates input signals for executing the application functions of the portable terminal, in response to a user's input, and outputs them to the controller 190. Examples of the application functions are a call function, a moving image reproduction, an audio file playback, an image displaying function, a broadcast viewing function, a camera function, an audio signal recording function, and functions of applications such as a calculator, a scheduler, etc. In an embodiment of the present invention, the input unit 170 further includes a mode switching key that can generate an input signal for switching between a general mode and an intelligent mode and can output it to the controller 190.

A display unit 180 can be implemented with a liquid crystal display (LCD) or a light emitting diode (LED, OLED) display. The display unit 180 displays a menu for the portable terminal, input data, function setting information, and additional information. For example, the display unit 180 serves to display a booting screen, a standby screen, a display screen, a call screen, other application executing screens, etc. In an embodiment of the present invention, the display unit 180 can display a GUI configured by a GUI configuring unit 198 that will be described later. The GUI is comprised of function information corresponding to the current environment information of the portable terminal, where each piece of function information is displayed as a graphic object such as a function executing icon, etc.

The controller 190 controls the entire operation of the portable terminal and signal flows among the elements included in the portable terminal. The operation of the controller 190 is explained in detail with reference to FIG. 2.

Figure 2:
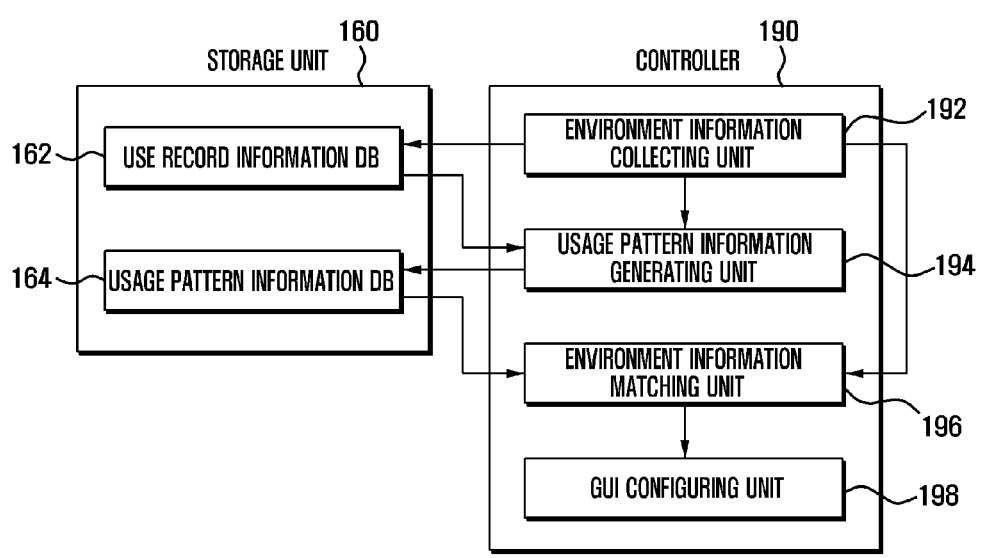
FIG. 2 is a detailed view illustrating the controller 190 of the portable terminal shown in FIG. 1.

FIG. 2 is a detailed view illustrating the controller 190 of the portable terminal shown in FIG. 1. In an embodiment of the present invention, the controller 190 includes an environment information collecting unit 192, a usage pattern information generating unit 194, an environment information matching unit 196, and a GUI configuring unit 198.

The environment information collecting unit 192 serves to collect current environment information regarding the portable terminal. The environment information collecting unit 192 collects environment information when a function is executed in the portable terminal. While the portable terminal is being operated in a standby mode, the environment information collecting unit 192 can also collect the environment information in real time or periodically. Examples of the environment information are time information, location information, etc. The location information can be collected by controlling at least one of the RF communication unit 110, the location measurement module 120, the short-range communication module 130, the audio processing unit 140, and the sensing unit 150 to collect information suitable for determining a location. In an embodiment of the present invention, the environment information collecting unit 192 can also collect information regarding surrounding devices by controlling the short-range communication module 130. The environment information collecting unit 192 stores the environment information, collected when a function is executed in the portable terminal, in the use record information DB 162. The environment information collecting unit 192 stores the environment information in the use record information DB 162, matching with the executed function information.

The usage pattern information generating unit 194 generates usage pattern information of the portable terminal based on use record information stored in the use record information DB 162. The use pattern information generating unit 194 analyzes use record information stored in the use record information DB 162, determines one or more common features of environment information according to the function information, and generates usage pattern information. For example, the use pattern information generating unit 194 classifies environment information stored in the use record information DB 162 based on functions, selects environment information from the classified environment information, as a reference, and separates the environment information identical to the selected environment information or environment information satisfying a preset error range. After that, the usage pattern information generating unit 194 determines whether the number of pieces of environment information identical to the selected environment information or the number of pieces of environment information satisfying a preset error range is equal to or greater than a preset number. If the number of pieces of environment information identical to the selected environment information or the number of pieces of environment information satisfying a preset error range is equal to or greater than the preset number, the usage pattern information generating unit 194 sets pattern environment information using environment information identical to the selected environment information or the environment information satisfying a preset error range. The pattern environment information may include an average, a minimum and a maximum environment information identical to the selected environment information or the environment information satisfying a preset error range. The pattern environment information may also include values out of a range, using the average, the minimum and the maximum. The set pattern environment information comprises usage pattern information, matching with corresponding function information. The usage pattern information generating unit 194 stores the generated usage pattern information in the usage pattern information DB 164.

The environment information matching unit 196 receives current environment information from the environment information collecting unit 192 and searches for pattern environment information, which is classified as belonging to the same environment as the current environment information from the usage pattern information DB 164. That is, the environment information matching unit 196 determines whether the current environment information is substantially identical to the pattern environment information stored in the usage pattern information DB 164. If the pattern environment information is stored as a value out of the range, the environment information matching unit 196 ascertains that the current environment information is contained in the range of the pattern environment information. The environment information matching unit 196 searches for pattern environment information satisfying the current environment information, extracts function information set in response to the searched pattern environment information, and outputs it to the GUI configuring unit 198.

The GUI configuring unit 198 receives the function information from the environment information matching unit 196, extracts a graphic object (for example, a function executing icon) corresponding to the received function information from the storage unit 160, and configures a GUI using the extracted graphic object. The GUI configuring unit 198 outputs the configured GUI to the display unit 180. The controller 190 controls the display unit 180 to display the configured GUI.

In the foregoing description, the portable terminal reflecting user's environment has been explained. The following description provides a method for operating the portable terminal.

In an embodiment of the present invention, the location information regarding the portable terminal can be acquired by the location measurement module 120, for example, a GPS module. It can also be acquired via the RF communication unit 110, the short-range communication module 130, the audio processing unit 140, and/or the sensing unit 150. That is, the types of elements for acquiring the location information of the portable terminal can be altered according to the range of location information to be acquired. For example, if it is intended to acquire location information regarding a relatively wide area, for example, "A Apt. Seocho-dong Seocho-gu Seoul," the portable terminal can acquire the location using only the location measurement module 120. If the portable terminal does not include the location measurement module 120, it can acquire the location information using signals that the RF communication unit 110 receives from at least three base stations. However, if it is intended to acquire location information regarding a relatively much smaller area, for example, the "living room of at 33-101 A Apt. Seocho-dong Seocho-gu Seoul," which cannot be processed by only the location measurement module 120, the portable terminal can acquire the location information using the short-range communication module 130, the audio processing unit 140 and/or the sensing unit 150 as well as the location measurement module 120.

Figure 3:
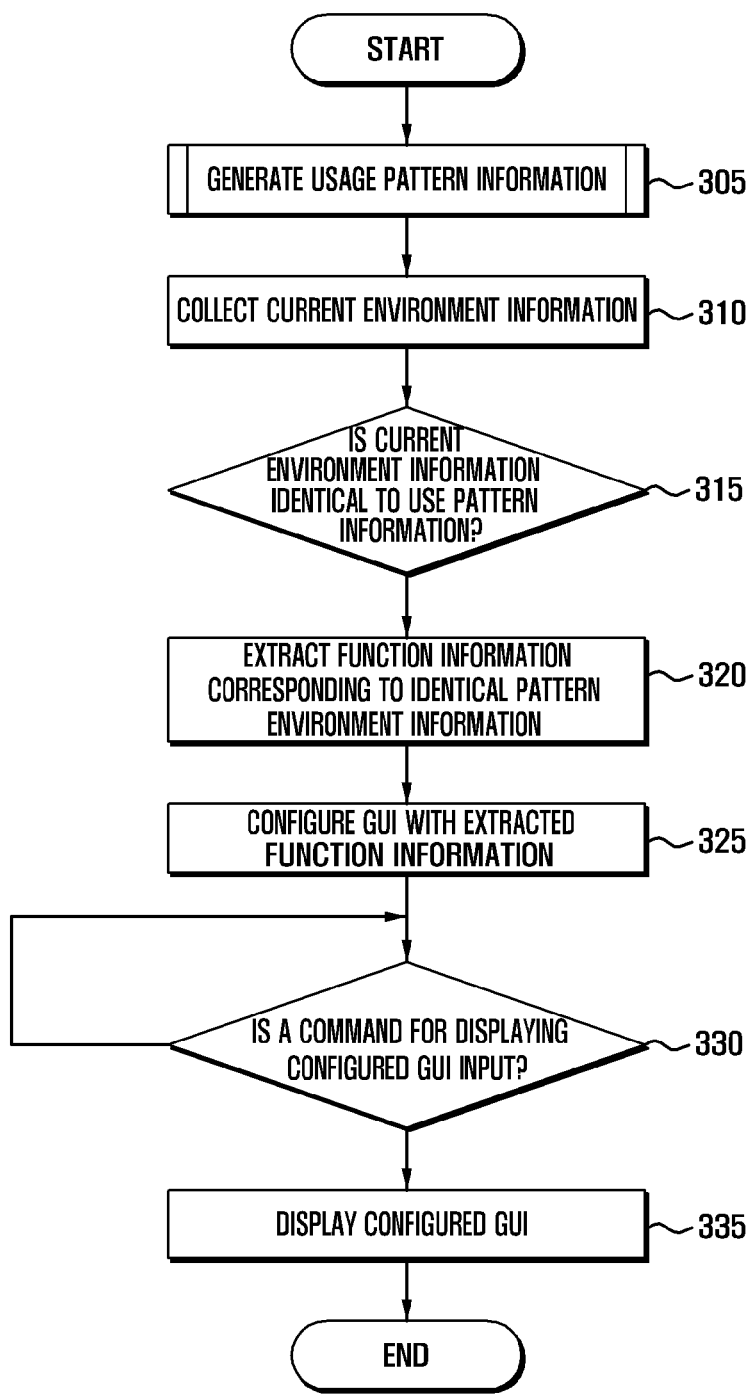
FIG. 3 is a flow chart that describes a method for operating a portable terminal reflecting a user's environment, according to an embodiment of the present invention.

FIG. 3 is a flow chart that describes a method for operating a portable terminal reflecting a user's environment, according to an embodiment of the present invention.

Referring to FIG. 3, the usage pattern information generating unit 194 generates usage pattern information (305). If the portable terminal is required to reflect a user's environment information, at least one piece of usage pattern information must be stored in the usage pattern information DB 164. The generation of usage pattern information is explained in detail with reference to FIG. 4.

FIG. 4 is a flow chart that describes, in detail, the step of generating usage pattern information, i.e., step 305 in the method shown in FIG. 3.

Referring to FIG. 4, the controller 190 receives an input signal from the input unit 170 and performs a corresponding function in the portable terminal (405). Examples of a function are a call function, a moving image reproduction, an audio file playback, an image displaying function, a broadcast viewing function, a camera function, an audio signal recording function, and functions of applications, such as a calculator, a scheduler, etc. The environment information collecting unit 192 collects environment information when a function is executed (410). The environment information collecting unit 192 can collect either the time information when a function is executed or the location information regarding the portable terminal or can collect both the time information and the location information. The environment information collecting unit 192 can also collect surrounding device information when a function is executed. The surrounding device information refers to information regarding other portable terminals or devices around the portable terminal. The environment information collecting unit 192 can also collect the time that a function is executed. The time that a function is executed refers to times, for example, a call time if the function to be executed is a call function, and an audio playback time if the function to be executed is an audio playback function.

The environment information collecting unit 192 collects current time information from a time measurement module included in the portable terminal or by receiving a signal from a base station. The environment information collecting unit 192 collects current location information regarding the portable terminal using at least one of the RF communication unit 110, the location measurement module 120, the short-range communication module 130, the audio processing unit 140, and the sensing unit 150. In an embodiment of the present invention, the environment information collecting unit 192 can also collect surrounding device information regarding other portable terminals or devices around the portable terminal by controlling the short-range communication module 130. For example, if the short-range communication module 130 is implemented with a Bluetooth module, the Bluetooth module broadcasts an inquiry periodically. If the short-range communication module 130 of the portable terminal receives inquiry responses from devices in the surrounding area, the portable terminal can detect and collect information regarding the other terminals and devices near the user's portable terminal.

The environment information collecting unit 192 stores the collected environment information in the use record information DB 162, which matches with the information regarding the executed function (415). The use record information DB 162 stores use record information regarding the history when the portable terminal executes functions. The function information may be information regarding applications initially installed in the portable terminals when they are manufactured, for example, a calculator, a scheduler, a stopwatch, an alarm, etc. The function may also be information regarding a use environment setting function for the portable terminal. For example, the use environment setting may be a ring sound setting, a vibration mode, a password setting, a manner mode setting, etc. If the application is an 'audio playback' or a 'moving image playback,' the function information may be information regarding corresponding content. In addition, if the application is a communication function, the function information may be information regarding the called party.

FIG. 5 is a view illustrating an example of use record information stored in a use record information DB 162, according to an embodiment of the present invention.

Referring to FIG. 5, the use record information is comprised of function information and environment information, where the environment information contains time information and location information. Although the embodiment is implemented in such a way that the environment information contains time information and location information, it should be understood that the present invention is not limited to the embodiment. The environment information may further contain other types of information that can determine the environment of the portable terminal, for example surrounding device information, temperature information, etc. As shown in FIG. 5, the function information field contains "Call [Min-Su KIM]," "Call [Cheol-Su KIM]," "Music playback [Fire]," "Music playback [Love]," and "Calculator." The time information field contains time information at which a corresponding function is executed. The location information field contains location information at which the corresponding function is executed. These fields are stored in the use record information DB 162.

The usage pattern information generating unit 194 generates usage pattern information using the use record information stored in the use record information DB 162 (FIG. 4, 420). The usage pattern information refers to information related to a pattern where and when each function is executed. The usage pattern information is comprised of pattern environment information and function information. In order to generate the user pattern information, the usage pattern information generating unit 194 first generates the pattern environment information using statistics of the environment information stored in the use record information DB 162. For example, the usage pattern information generating unit 194 separates environment information by identical function information in the use record information. Referring to FIG. 5, the usage pattern information generating unit 194 classifies the environment information (i.e., time information and location information) based on operations that have been performed (i.e., "Call [Min-Su KIM]," "Call [Cheol-Su KIM]," "Music playback [Fire]," "Music playback [Love]," and "Calculator"). The usage pattern information generating unit 194 extracts the "environment information" related to "Call [Min-Su KIM]," i.e., '13:21, 7.11, 2009 and A Apt. Seocho-dong Seocho-gu Seoul,' '13:25, 7.12, 2009 and A Apt. Seocho-dong Seocho-gu Seoul' and '13:31, 7.13, 2009 and A Apt. Seocho-dong Seocho-gu Seoul.'

The usage pattern information generating unit 194 specifies one of the pieces of environment information classified by the function information, and determines whether the remaining pieces of environment information are identical to the specified environment information or are within a preset error range. For example, if the usage pattern information generating unit 194 specifies '13:21, 7.11, 2009 and A Apt. Seocho-dong Seocho-gu Seoul' with reference to 'Call [Min-Su KIM],' a determination is made whether the remaining environment information ('13:25, 7.12, 2009 and A Apt. Seocho-dong Seocho-gu Seoul' and '13:31, 7.13, 2009 and A Apt. Seocho-dong Seocho-gu Seoul') is identical to the specified environment information or is within a preset error range (i.e., substantially identical). The determination is conducted with respect to 'time and minute' other than 'data (month/day/year).' 'Date' serves to generate a time pattern, for example, 'everyday,' 'a period of two days,' 'a period of one day,' etc. If the error range of the 'time information' is set in units of '20 minutes,' the remaining time information ('13:25, 7.12, 2009'->4 minutes difference, from '13:21, 7.11, 2009' of the specified environment information, and '13:31, 7.13, 2009'->10 minutes difference) is all within the set error range. 'Location information' is identical in the specified environment information and the remaining environment information. Similarly, the location information may be within a known error range, in a manner similar to the preset error range described with regard to the time determination.

The usage pattern information generating unit 194 classifies specified environment information ('13:21, 7.11, 2009 and A Apt. Seocho-dong Seocho-gu Seoul') and identical environment information or environment information satisfying a preset error range (13:25, 7.12, 2009 and A Apt. Seocho-dong Seocho-gu Seoul' and '13:31, 7.13, 2009 and A Apt. Seocho-dong Seocho-gu Seoul'), and determines whether the number of classified environment information (containing the number of specified environment information) is equal to or greater than a known number required to generate usage pattern information.

In an embodiment of the present invention as shown in FIG. 3, it is assumed that the number required to generate usage pattern information is three. However, it would be recognized that the number required to generate usage pattern information may be altered without altering the scope of the invention.

With reference to example of 'Call [Min-Su KIM]', '13:21, 7.11, 2009 and A Apt. Seocho-dong Seocho-gu Seoul,' '13:25, 7.12, 2009 and A Apt. Seocho-dong Seocho-gu Seoul' and '13:31, 7.13, 2009 and A Apt. Seocho-dong Seocho-gu Seoul', these elements are all classified into the identical environment information or the environment information satisfying a set error range. The number of classified environment information is three. Therefore, the usage pattern information generating unit 194 concludes that the number of classified environment information satisfies the number required to generate usage pattern information. The usage pattern information generating unit 194 generates 'pattern time information' using '13:21, 7.11, 2009,' '13:25, 7.12, 2009,' '13:31, 7.13, 2009' and 'pattern location information' using 'A Apt. Seocho-dong Seocho-gu Seoul.' The 'pattern time information' and 'pattern location information.' are matched and form 'pattern environment information.'

In order to generate 'pattern time information', the usage pattern information generating unit 194 may use only 'time' and 'minute' or further 'date' together. If the same function is repeated on 'Jul. 11, 2009, Jul. 18, 2009, and Jul. 25, 2009', based on a unit of one week and at the same time, the usage pattern information generating unit 194 may set the 'period' as 'one week.' When the use pattern information generating unit 194 generates pattern time information using 'time' and 'minute', it may alter the unit (i.e., period) of examination. For example, when the usage pattern information generating unit 194 generates pattern time information using '13:21, 7.11, 2009,' '13:25, 7.12, 2009,' '13:31, 7.13, 2009,' the generating unit 194 can use the unit of minute (e.g., 1 minute, such as '13:21' for example), the unit of minute intervals, (e.g., 20 minutes, such as 13:20 through 13:40), or the unit of hour intervals, (e.g., 1 hour, such as 13:00 through 14:00'), etc. in order to generate pattern time information.

In order to generate 'pattern location information', the usage pattern information generating unit 194 may use the unit of a range of area that is identical to or wider than a range of area of location information contained in the use record information. For example, if the use record information DB 162 stores 'A Apt. Seocho-dong Seocho-gu Seoul,' as location information, the usage pattern information generating unit 194 can generate pattern location information based on 'A Apt. Seocho-dong Seocho-gu Seoul' or based on a wider area, i.e., Seocho-dong Seocho-gu Seoul.'

In an embodiment of the present invention, if surrounding device information (for example, an address of a Bluetooth device, BD_ADDR) serving as environment information is additionally stored in the use record information DB 162, the usage pattern information generating unit 194 may generate 'pattern surrounding device information' as an element of the pattern environment information.

In an embodiment of the present invention, if a function execution time serving as environment information is additionally stored in the use record information DB 162, the usage pattern information generating unit 194 may generate 'information regarding a pattern of a function execution time' as an element of the pattern environment information.

The usage pattern information generating unit 194 generates use usage information by matching the generated pattern environment information with the function information, and stores it in the usage pattern information DB 164 (FIG. 4, 425). If the function information stored in the use record information DB 162 is 'Call' the usage pattern information generating unit 194 can store 'Call' as function information in the usage pattern information DB 164. The usage pattern information generating unit 194 can also store 'Communication' containing information regarding all types of communication means, such as 'Call,' 'Message,' 'E-mail,' etc., as function information, in the usage pattern information DB 164. That is, the usage pattern information generating unit 194 classifies the function information by classifying the function based on both the called party's information and the communication means information or based on either only the called party's information or only the communication means information.

FIG. 6 is a view illustrating an example of usage pattern information stored in a usage pattern information DB 164, according to an embodiment of the present invention.

As shown in FIG. 6, in the usage pattern information DB 164, '13:00 through 14:00' is stored in the 'pattern time information' field, and 'A Apt. Seocho-dong Seocho-gu Seoul' is stored in the 'pattern location information' field, by matching 'Communication [Min-Su KIM]' and 'Music playback [Fire]' in the 'function information' field. Likewise, '14:00 through 15:00' is stored in the 'pattern time information' field, and '679 Yeoksam-dong Gangnam-gu Seoul' is stored in the 'pattern location information' field, by matching 'Music playback [Love]' in the 'function information.' The usage pattern generating unit 194 sets 'pattern time information' as a unit of 'one hour' and also sets the 'pattern location information' as the same unit as the 'location information' stored in the use record information DB 162. The use pattern information, stored in the usage pattern information DB 164, is data required to reflect a user's environment information in the portable terminal.

In the foregoing description, the process of generating usage pattern information, step 305 of FIG. 3, has been explained. In the following description, it is assumed that at least one of the pieces of usage pattern information is stored in the usage pattern information DB 164.

Referring back to FIG. 3, the environment information collecting unit 192 collects current environment information regarding the portable terminal, in real time or periodically, (310). The process for collecting current environment information is the same as that as described with regard to step 410. That is, the environment information collecting unit 192 collects current time information, current location information, current surrounding device information, etc., as current environment information.

The environment information matching unit 196 receives current environment information from the environment information collecting unit 192 and determines whether the pattern environment information is identical to the received current environment information stored in the usage pattern information DB 164 (315). If the usage pattern information DB 164 stores 'usage pattern information' comprised of 'pattern environment information' and 'function information,' the environment information matching unit 196 extracts pattern environment information identical to the current environment information from the usage pattern information DB 164. If the pattern environment information is comprised of 'pattern time information' and 'pattern location information,' the environment information matching unit 196 detects the current time information and the current location information, and extracts pattern environment information, comprised of 'pattern time information' and 'pattern location information' identical to the current time information and the current location information, from the usage pattern information DB 164. For example, if the environment information collecting unit 192 collects current environment information where the current time information is '13:21' and the current location information is 'A Apt. Seocho-dong Seocho-gu Seoul,' and the usage pattern information DB 164 stores 'pattern environment information' that contains the elements '13:21' and 'A Apt. Seocho-dong Seocho-gu Seoul,' the environment information matching unit 196 extracts the stored pattern environment information.

If the pattern environment information is set in a range of area wider than the area of the environment information stored in the use record information DB 162, the environment information matching unit 196 determines whether the current environment information is included in a range of the pattern environment information. For example, the environment information collecting unit 192 collects current environment information where the current time information is '13:21' and the current location information is 'Seocho-dong Seocho-gu Seoul,' and the usage pattern information DB 164 stores 'pattern environment information' that contains the elements '13:00 through 14:00' and 'A Apt. Seocho-dong Seocho-gu Seoul,' the environment information matching unit 196 extracts the stored pattern environment information.

The environment information matching unit 196 extracts at least one of the pieces of function information, set to correspond to pattern environment information identical to the current environment information, from the use pattern information DB 164 (320). Referring to FIG. 6, if the current environment information contains the elements '13:21' and 'A Apt. Seocho-dong Seocho-gu Seoul,' the environment information matching unit 196 extracts 'Communication [Min-Su KIM]' and 'Music playback [Fire]' set in response to the elements '13:00 through14:00' and 'A Apt. Seocho-dong Seocho-gu Seoul.' If a user has been located at 'A Apt. Seocho-dong Seocho-gu Seoul' before '13:00,' when time reaches '13:00,' the environment information matching unit 196 extracts 'Communication [Min-Su KIM]' and 'Music playback [Fire].' However, if the user arrives at 'A Apt. Seocho-dong Seocho-gu Seoul' at '13:21,' the environment information matching unit 196 extracts 'Communication [Min-Su KIM]' and 'Music playback [Fire]' at the arrival time ('13:21').

The GUI configuring unit 198 configures a graphic user interface (GUI) using the extracted function information (325). In an embodiment of the present invention, the storage unit 160 stores graphic objects corresponding to respective function information. An example of the graphic objects is a 'function execution icon.' The GUI configuring unit 198 configures GUIs using the graphic objects and displays them on the display unit 180.

Figure 7A:
FIG. 7A and FIG. 7B show screens on which GUIs configured by the GUI configuring unit 198 are displayed, according to an embodiment of the present invention.
Figure 7B:
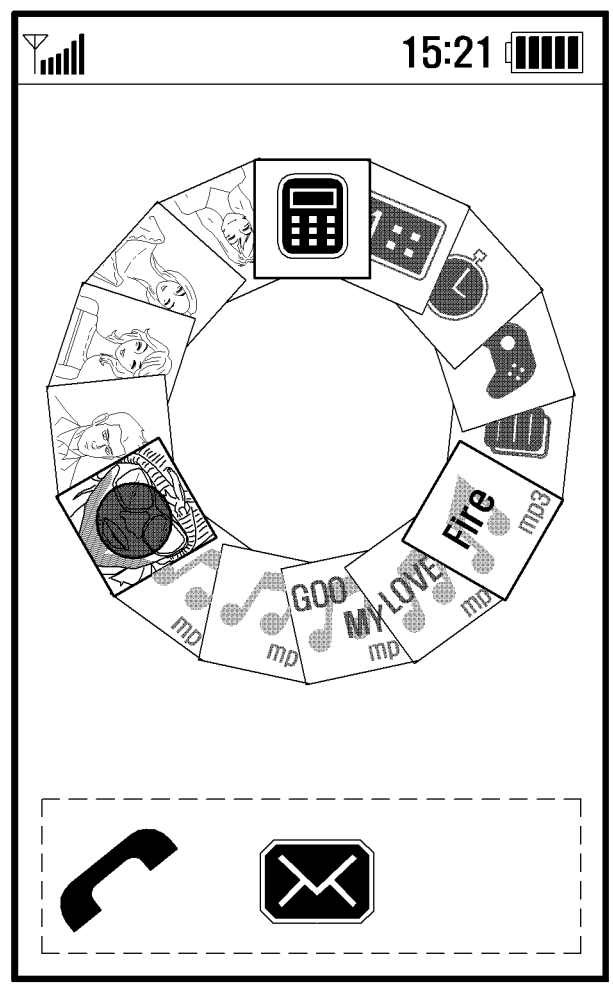

FIG. 7A and FIG. 7B show screens on which GUIs configured by the GUI configuring unit 198 are displayed, according to an embodiment of the present invention. FIG. 7A shows icons that correspond to functions that a user frequently uses from a particular environment information. For example, the usage pattern information DB 164 stores 'pattern environment information' comprised of the elements '15:00 through 16:00' and '60 Yiodo-dong Yeongdeungpo-gu Seoul' and 'function information' comprised of 'a calculator, a scheduler, a stopwatch, a Music playback [Fire], a Music playback [Love], a Music playback [Goodbye My Love], a Communication [Min-Su KIM], Communication [Cheol-Su KIM], a Communication [Young-Hee KIM], the GUI configuring unit 198 configures the GUI, using icons to represent the function information for a current environment information ('15:21' and '60 Yiodo-dong Yeongdeungpo-gu Seoul').

If the user has been located at '60 Yiodo-dong Yeongdeungpo-gu Seoul' before 15:00 and the time is 15:00, the GUI configuring unit 198 configures a GUI using icons representing the function information. If the user moves and arrives at '60 Yiodo-dong Yeongdeungpo-gu Seoul' at 15:21, the GUI configuring unit 198 configures a GUI using icons representing the function information at the arrival time (15:21). The GUI configuring unit 198 can classify the icons by categories. As shown in FIG. 7A, a 'calculator,' a 'scheduler,' and a 'stopwatch' are function execution icons contained in the application category basically installed to the portable terminal. 'Fire,' 'Love,' and 'Goodbye My Love,' are function execution icons for reproducing music or moving image, which contain contents information. 'Min-Su KIM,' 'Cheol-Su KIM,' and 'Young-Hee KIM' are function execution icons containing called party's information in a 'communication function.' 'Call' and 'Message' are function execution icons containing means information in a 'communication function.' The function execution icons corresponding to 'Call' and 'Message' can be displayed when the user selects one of the icons 'Min-Su KIM,' 'Cheol-Su KIM,' and 'Young-Hee KIM.'

FIG. 7B shows a screen on which icons are displayed, aligned differently from those shown in FIG. 7A. That is, the icons are circularly aligned with respect to the center of the screen and the representative icon of each category, for example, 'calculator,' 'Fire,' and 'Min-Su KIM,' is placed on the uppermost layer. In one aspect of the invention, the GUI configuring unit 198 can configure icons in an order of the most frequently used function in particular environment information. As shown in FIG. 7B, the icons showing means information of a communication function, such as 'Call' and 'Message,' are displayed. The icons showing means information of a communication function can also be displayed only if a user selects an icon (Min-Su KIM) representing the called party's information.

In an embodiment of the present invention, the GUI configuring unit 198 can determine a time for configuring GUI, using pattern information of time to execute a function. If information regarding the time to execute a function is stored in the use record information DB 162 and information regarding a pattern of time to execute a function is also stored in the usage pattern information DB 164, the environment information matching unit 196 transfers the usage pattern information and the information regarding the patter of time to execute a function to the GUI configuring unit 198. The GUI configuring unit 198 receives the information and determines the time required to configure a GUI from a graphic object of corresponding function information. For example, if a user sets the terminal in such a way that 'Music playback [Fire]' is executed and the playback is terminated after approximately 30 minutes, the GUI configuring unit 198 configures 'Music playback [Fire]' as graphic icon on the GUI and then deletes the graphic icon associated with this element from the GUI after 30 minutes has elapsed.

The controller 190 controls the input unit 170 to determine whether a user inputs a command for displaying the configured GUI (330). If the controller 190 ascertains that a user has input a command for displaying the configured GUI at 330, the controller controls the display unit 180 to display the configured GUI (335). In an embodiment of the present invention, the screen can be displayed in two modes. One is a general mode where a background screen is displayed and another is an intelligent mode where a GUI, configured by the GUI configuring unit 198, is displayed on the screen. The input unit 170 includes a 'mode switching key' for receiving a command to display an intelligent mode. The GUI configuring unit 198 configures a GUI in real time. The general mode is switched to the intelligent mode according to a user's mode switching key, and the controller 190 controls the display unit 180 to display the intelligent mode screen. When a mode switching key is input while the intelligent mode screen is being displayed, the controller 190 controls the display unit 180 to display the general mode screen. The controller 190 displays current environment information in the intelligent mode.

Illustrations [a]-[c] of FIG. 8 show screens displayed when modes are switched according to an embodiment of the present invention, which is explained based on the usage pattern information shown in FIG. 6. Illustration [a] of FIG. 8 shows a background screen displayed when a portable terminal is operated in a general mode. When a user executes a mode switching key of the input unit 170, the controller 190 controls the display unit 180 to display a screen of an intelligent mode, as shown in illustration [b] of FIG. 8. Illustration [b] of FIG. 8 shows current time information (13:32), current location information (A Apt. Seocho-dong Seocho-gu Seoul), and function information (Communication [Min-Su KIM] and Music playback [Fire]) corresponding to the current time and the current location. When the time reaches 13:00, the GUI configuring unit 198 detects the current location as 'A Apt. Seocho-dong Seocho-gu Seoul' and then configures the GUI shown in illustration [b] of FIG. 8. If the GUI configuring unit 198 configures a GUI irrespective of a user's input command, the controller 190 controls the display unit 180 to display the configured GUI, directly. The controller 190 can also display the GUI when it receives an input signal for displaying a GUI from the input unit 170.

Illustration [c] of FIG. 8 shows a screen displaying a GUI configured according to current environment information. For example, if the user leaves 'A Apt. Seocho-dong Seocho-gu Seoul' for '679 Yeoksam-dong Gangnam-gu Seoul,' the environment information collecting unit 192 continuously collects current environment information. When the user arrives at '679 Yeoksam-dong Gangnam-gu Seoul' at 14:20, the environment information matching unit 196 receives the environment information from the environment information collecting unit 192 and searches for pattern environment information ('679 Yeoksam-dong Gangnam-gu Seoul' at 14:20), identical to (or within a known range of) the received environment information, from the use pattern information DB 164. The environment information matching unit 196 extracts function information (Music playback [Love]) corresponding to the elements '14:00 through 15:00' and '679 Yeoksam-dong Gangnam-gu Seoul' and transfers it to the GUI configuring unit 198. The GUI configuring unit 198 configures a GUI using an icon corresponding to 'Music playback [Love].' The controller 190 receives an input signal for displaying a GUI from the input unit 170 and then displays the GUI on the display unit 180 as shown in FIG. 8C.

As described above, the present invention analyzes a usage pattern of a portable terminal user and provides a GUI to comply with the user's usage pattern when matching a particular environment, so that the user can conveniently use the portable terminal.

The above-described methods according to the present invention can be realized in the controller in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

As described above, since the present invention can provide a user interface (UI) most appropriate for a user's environment, the user can easily execute their desired functions of the portable terminal.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method for providing a user interface reflecting a user's environment in a portable terminal, the method comprising:

collecting an environment information in real time or periodically when a function is executed in the portable terminal, the environment information comprise time information, location information;
storing the environment information matching with the executed function information in memory;
generating usage pattern information by analyzing the environment information matching with the executed function information, wherein the analyzing the environment information comprises:
classifying the environment information based on the executed functions,
separating the environment information identical or satisfying a preset error range,
determining whether the environment information identical to the classified environment information or a number of pieces of environment information satisfying a preset error range is equal to or greater than a preset number,
collecting current environment information of the portable terminal; and
responsive to the current environment information matching the usage pattern information, displaying a graphic user interface (GUI) containing an icon that corresponds to execution means of the function or information related to the function;
wherein the current environment information of the portable terminal comprises at least one of current time information, and current location information.

2. The method of claim 1, wherein generating the usage pattern information comprises:
executing the function;
collecting environment information when the function is executed;
storing the collected environment information in association with the function; and
generating the usage pattern information based on the stored environment information.

3. The method of claim 1, wherein the current environment information further comprises information regarding a communication modality which is used by the portable terminal when communicating with an external portable terminal.

4. The method of claim 1, wherein, the function includes a content playback function.

5. The method of claim 2, wherein, if the function is a communication function, the storing the collected environment information comprises storing an identifier for an external portable terminal in relation with which the communication function is performed.

6. The method of claim 1, further comprising displaying the GUI in a circular format.

7. An electronic device comprising a display unit and a controller configured to:
collect an environment information in real time or periodically when a function is executed in the electronic device; the environment information comprise time information, location information;
store the environment information matching with the executed function information in memory;
generate usage pattern information by analyzing the environment information matching with the executed function information, wherein controller for analyzing the environment information is configured to:
classify the environment information based on the executed functions,
separate the environment information identical or satisfying a preset error range;
determine whether the environment information identical to the classified environment information or a number of pieces of environment information satisfying a preset error range is equal to or greater than a preset number;
collect current environment information; and
responsive to the current environment information matching the usage pattern information, display, on the display unit, a graphic user interface (GUI) containing an icon that corresponds to execution means of the function or information related to the function,
wherein the current environment information of the electronic device comprises at least one of current time information, and current location information.

8. The electronic device of claim 7, wherein generating the usage pattern information comprises:
executing the function;
collecting environment information when the function is executed;
storing the collected environment information in association with an identifier for the function; and
generating the usage pattern information based on the stored environment information.

9. The electronic device of claim 7, wherein the current environment information comprises information regarding a communication modality which is used by the electronic device when communicating with another electronic device.

10. The electronic device of claim 7, wherein the GUI is displayed in a circular format.

11. A portable device comprising:
an input device,
a display device; and
a controller comprising:
a processor in communication with a memory, the memory including code, which when accessed by the processor causes the processor to:
collect an environment information in real time or periodically when a function is executed in the portable device, the environment information compose time information, location information;
store the environment information matching with the executed function information in memory;
generate usage pattern information by analyzing the environment information matching With the executed function information, wherein the processor for analyzing the environment information is configured to:
classify the environment information based on the executed functions,
separate the environment information identical or satisfying a preset error range;
determine whether the environment information identical to the classified environment information or a number of pieces of environment information satisfying a preset error range is equal to or greater than a preset number;
collect current environment information of the portable device;
responsive to the current environment information matching the usage pattern information, display, on the display device, a graphic user interface (GUI) containing an icon that corresponds to execution means of the function or information related to the function,
wherein the current environment information of the portable device comprises at least one of current time information, and current location information.

12. The portable device of claim 11, wherein generating the pattern information comprises:
executing the function;

collecting environment information when the function is executed;

storing the collected environment information in association for the function; and generating the usage pattern information based on the stored environment information.

13. The portable device of claim 11, wherein the current environment information comprises information regarding a communication modality which is used by the portable device when communicating with an external device.

14. The portable device of claim 11, wherein responsive to an input from the input device, the processor accesses code to select between a general mode and an intelligent mode of the GUI.

15. The portable device of claim 11, wherein the GUI is displayed in a circular format.

* * * * *

UNITED STATES PATENT AND TRADEMARK OFFICE
CERTIFICATE OF CORRECTION

PATENT NO.        : 9,032,315 B2
APPLICATION NO.   : 12/851587
DATED             : May 12, 2015
INVENTOR(S)       : Hyang Ah Kim et al.

Page 1 of 1

It is certified that error appears in the above-identified patent and that said Letters Patent is hereby corrected as shown below:

In The Claims

Column 16, Claim 8, Line 19 should read as follows:
--...with the function; and...--

Column 16, Claim 11, Line 37 should read as follows:
--...environment information comprise time...--

Column 16, Claim 11, Line 42 should read as follows:
--...matching with the executed...--

Signed and Sealed this
Eleventh Day of August, 2015

Michelle K. Lee
*Director of the United States Patent and Trademark Office*